United States Patent [19]

Sapyta

[11] Patent Number: 5,669,525
[45] Date of Patent: Sep. 23, 1997

[54] COLLAPSIBLE BUCKET

[76] Inventor: Rachel Theora Sapyta, 15415 Triple Creek, San Antonio, Tex. 78247

[21] Appl. No.: 663,868

[22] Filed: Jun. 19, 1996

Related U.S. Application Data

[63] Continuation of Ser. No. 289,369, Aug. 11, 1994, abandoned.

[51] Int. Cl.$^6$ ............................................. B65D 30/10
[52] U.S. Cl. ............................ 220/9.1; 220/904; 119/65
[58] Field of Search ................. 220/9.1, 904; 119/65, 119/66, 67, 68, 69; 224/602, 605, 631

[56] References Cited

U.S. PATENT DOCUMENTS

| | | | |
|---|---|---|---|
| 33,318 | 9/1861 | Fitts | 220/904 X |
| 1,022,183 | 4/1912 | Doutney | 119/65 |
| 1,029,148 | 6/1912 | Schultz | 119/65 |
| 1,053,766 | 2/1913 | Zadora | 119/65 |
| 1,095,631 | 5/1914 | Heilborn | 220/904 X |
| 1,147,051 | 7/1915 | Sierzbnski | 119/65 |
| 5,255,833 | 10/1993 | McAllister | 224/202 |

OTHER PUBLICATIONS

"The Quicker–Quick–Lunch", New York Journal, Published Nov. 24, 1914 Last page.
Champion's Complete Specification, No.16,344, Published Nov. 28, 1887.
A sheet illustrating 5 prior art buckets from recent catalogs relating to horse products, including a collapsible bucket (bottom right). Dates and sources unknown.

*Primary Examiner*—Stephen Cronin
*Attorney, Agent, or Firm*—Gunn, Lee & Miller, P.C.

[57] ABSTRACT

A collapsible bucket having a flexible, rectangular body for containing horse feed, grain or the like and having a pair of support straps with skirts engaging the side walls of the body and further having an adjustable carrying strap attached to the support strap.

4 Claims, 3 Drawing Sheets

COLLAPSIBLE BUCKET

This application is a continuation of application Ser. No. 08/289,369, filed Aug. 1, 1994 now abandoned.

FIELD OF THE INVENTION

A collapsible bucket, more specifically, a rectangular bucket having a rigid frame and fabric body, with handles having side skirts thereon.

BACKGROUND OF THE INVENTION

Buckets used for holding both liquid materials and dry materials are well known in the prior art. These buckets can be either soft bodied (collapsible) or hard bodied, and are typically cylindrical in shape with a single material, permanently attached, handle Prior art collapsible buckets suffer from a number of shortcomings. First, the size and the shape of the traditional collapsible bucket leave much to be desired. The cylindrical bucket is too deep and narrow, and is a danger to an animal that might eat from it. As the animals feeds from the narrow, deep cylinder, it must insert its head further and further down into the bucket. This action increases the danger of an animal getting stuck in the bucket or getting caught in the permanently attached handle. The handle in the prior art collapsible buckets can also cause other problems and inconveniences. Currently, the prior art collapsible buckets handle is made from a short length of rope-like material that is hung between one side of the bucket and the other. This loop is often too short to be hung from any surface without limiting access to the interior of the buckets and its contents. The length of the bucket handle, and the fact that the handle does not detach at any point from the bucket edge, create a danger to the animal when hung, and is awkward for the person trying to hang the bucket. In order for the current collapsible to be hung from a surface, a person must employ another length of rope, chain, wire or the like that would be wrapped around the surface to be hung (such as fence) then attached to the bucket with a connector, such as a snap or wire. The current handle also makes carrying the bucket in either the collapsed or expanded form difficult. The handle is too short to be hung on a person's shoulder; and therefore, a person can only carry one bucket, if that bucket has any material inside of it, in each hand.

Current hard-sided buckets have their own inherent problems. Though they are proportioned correctly for an animal to eat easily and without danger from the bucket, they, too, are very difficult to hang and carry; and, in addition, they are also difficult to store. Like their collapsible cousins, the current hard-bodied bucket handles are too short to be carried on the shoulders and, therefore, must be carried one to each hand. The hard-bodied buckets are also quite heavy, even empty, which limits how many buckets can be carried by one individual. The hard-bodied buckets also do not have a handle such that the bucket can be hung without the employment of another length of rope, chain, wire, or the like wrapped around the surface to be hung, then attached to the handle of the hard-bodied buckets. Storing the hard-bodied bucket is also a problem. The buckets stack one inside the other for storage; and, due to their large size, they take up a lot of space when stacked.

Additionally, neither the current collapsible bucket nor the hard-bodied buckets offer a solution to the problem of messy eaters. Animals feeding out of the current buckets often worry the buckets in such a manner that they tip the bucket and spill the contents. Current buckets offer no solution to this problem.

What is needed, therefore, is a bucket that offers the following features: a) a collapsible body that limits the weight of the bucket and allows for bucket storage in minimal space, b) a collapsible bucket with a body that allows easy and safe access to the full interior of the bucket by the animal when the bucket is hung, c) a bucket that has a carry strap, instead of a handle, that is long enough to be carried on a person's shoulder, d) a bucket that has a handle that can be disconnected on one end, adjusted in length, wrapped around the surface to be hung, then reconnected to the bucket; and e) a bucket that has side panels that prevent contents spillage.

SUMMARY OF THE INVENTION

This and other objects are provided in a bucket having a rectangular frame that defines an area sufficient for an animal to easily insert its head and access all areas of the interior of the bucket. The body depth of the inventor's bucket will be sufficiently shallow as to remove the danger of the animal's head becoming stuck in either the bucket rim or the bucket's handle.

It is a further object of the present invention to provide for a collapsible bucket with a handle that is actually an adjustable shoulder strap that can be unhooked at one end, wrapped around any surface for hanging, then rehooked, therefore providing a bucket that can be hung easily on any surface and that allows, when hung, easy access by an animal to the entire interior of the bucket, without interference from the shoulder strap-type handle.

It is a further object of the present invention to provide for a collapsible bucket that has a rectangular rim, and that has a sufficiently long adjustable shoulder strap-type handle that it may be hung from any surface and that also has side skirts that protect the animal from the danger of getting its head stuck in the side straps as well as limit the spillage of the materials placed in the buckets.

It is a further object of the present invention to provide for a collapsible bucket with a rectangular rim whose body material is made from a fabric or material that is sufficiently strong so that it withstands frequent hard use, and whose fabric can be provided in a variety of colors.

It is a further object of the present invention to provide for a collapsible bucket that has a rectangular rim, with a handle that is actually a sufficiently long, adjustable shoulder strap that can be unhooked at one end, wrapped around any surface for hanging, then rehooked, thereby providing a bucket that can be hung easily on any surface and that allows, when hung, easy access by an animal to the entire interior of the bucket without interference from either the rim of the bucket or the shoulder strap-type handle, and that the bucket also has side skirts that protect the animal from the danger of getting its head stuck in the side straps, as well as that limit the spillage of the materials placed in the buckets. Furthermore, the body material is made from a fabric or material that is sufficiently strong that it withstands frequent hard use and is available in a variety of colors.

DETAILED DESCRIPTION OF THE PREFERRED EMBODIMENT

Figure 1:
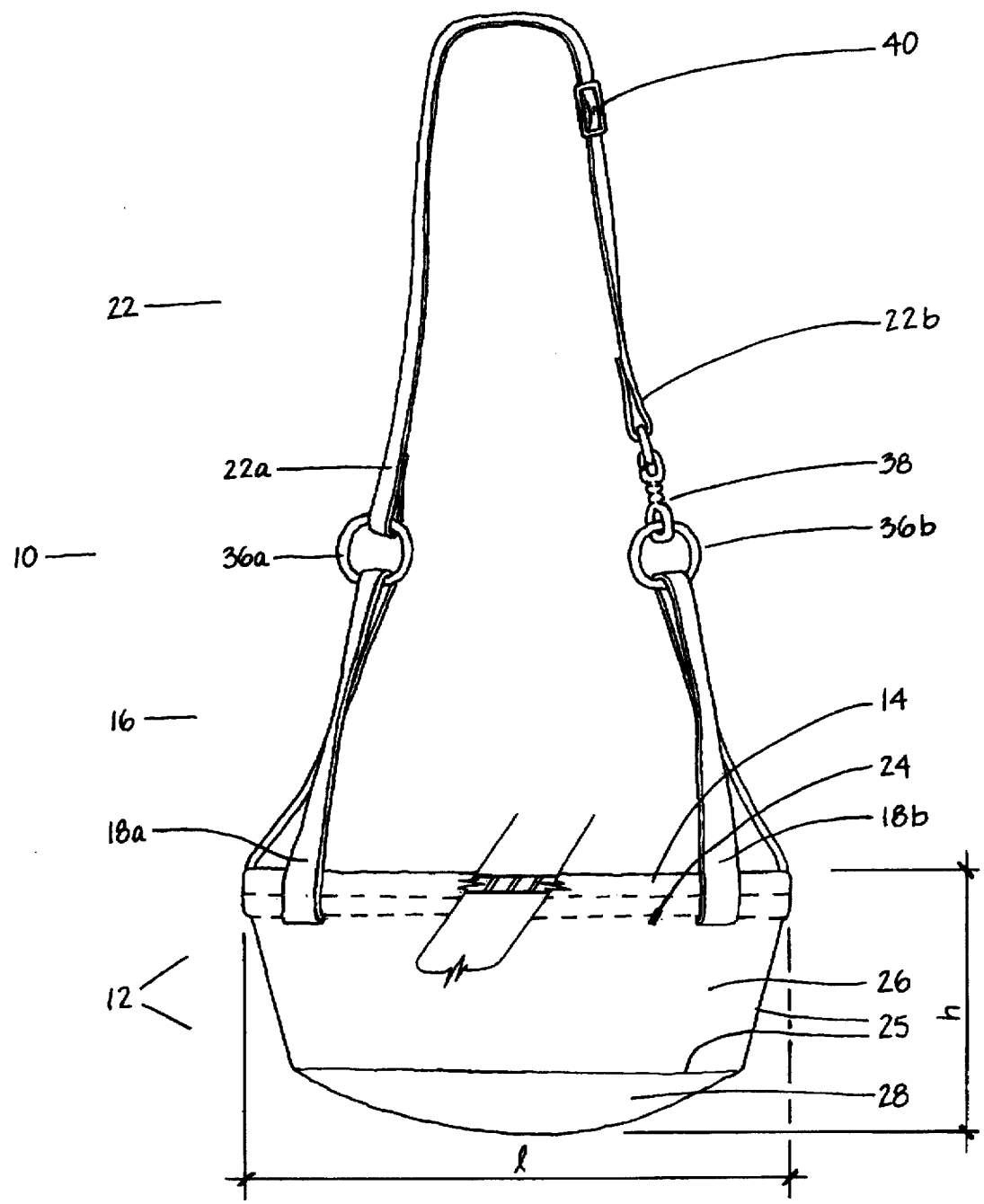
FIG. 1 is a front elevation view of the bucket of applicant's present invention.
Figure 2:
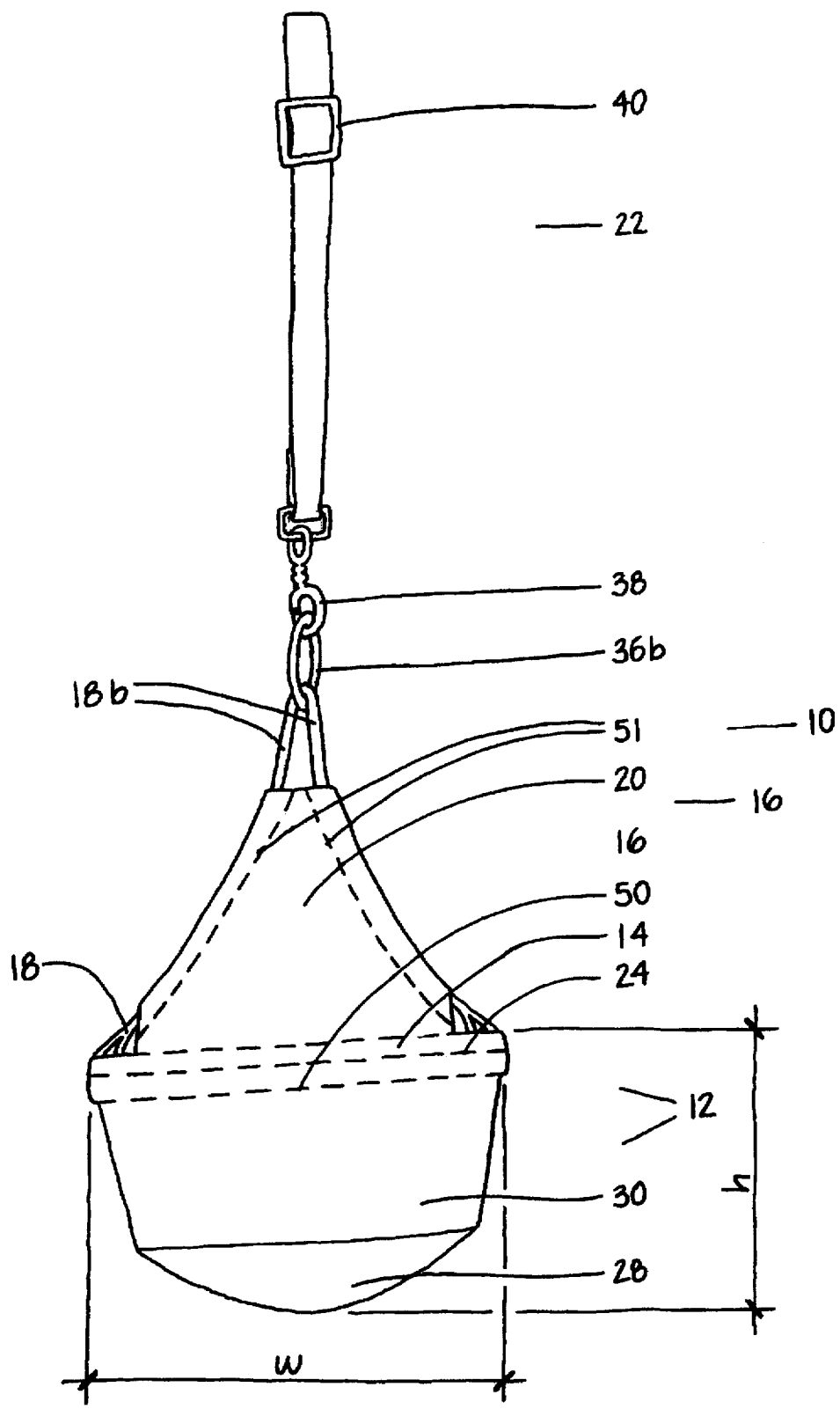
FIG. 2 is a right side elevation view of the bucket of applicant's present invention.
Figure 3:
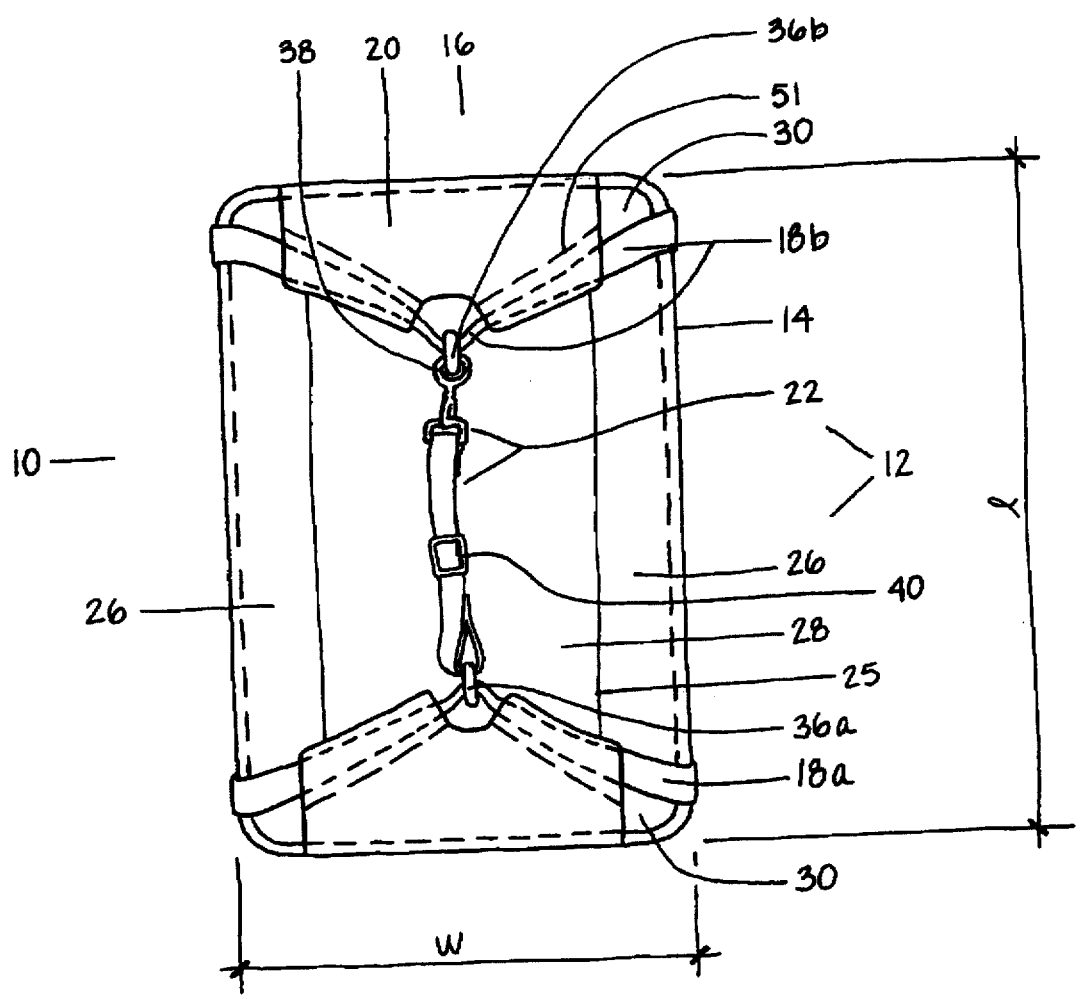
FIG. 3 is a top elevation view of the bucket of applicant's present invention.

FIGS. 1–3 illustrate the various features of applicant's present invention. Specifically, FIG. 1 illustrates that applicant's present invention is made up of three main parts: a rectangular, fabric, typically waterproof body (12) suspended from and typically enclosing a rectangular metal frame (14). Typically, frame (14) and body (12) are suspended by a handle (16), typically attached to frame (14) or body (12) by means of a pair of support straps (18) connected to the frame (14) and/or the body (12). Carrying strap (22) connects one support strap (18a) to the second support strap (18b).

Body (12) is seen to be comprised of a lip (24) formed by wrapping the material around metal frame (14), side walls (26), bottom wall (28) and end walls (30). The various walls meet at seams (25). Moreover, opposite walls (26) are approximately identical in dimension as are opposite walls (30). Lip (24) is typically wrapped around frame and either sewn or heat sealed, while seams (25) are heat sealed so as to create a waterproof joiner.

FIG. 3 illustrates the dimension of body (12), specifically length (L) and width (W). FIG. 1 illustrates the height (H) of the body (12) of the bucket and length (L). It is to be appreciated with reference to FIGS. 1, 2 and 3, that the general rectangular shape of the body (12) is provided such that the height is less than the typical depth of the prior art cylindrical, collapsible buckets or typically less than about twelve (12) inches. Moreover, applicant's bucket has a body (12) that is typically, in length dimension, greater than the diameter of the prior art cylindrically-shaped, collapsible buckets, or greater than eight (8) inches. Such dimensions provide for a bucket having sufficient size such that there is easy access to the interior of the bucket without interference from the lip (24) or handle (16) of the bucket. The table below indicates the preferred dimensions of the applicant's present invention.

|  | Length | Width | Height |
| --- | --- | --- | --- |
| Preferred Dimensions | 15" | 10" | 8" |
| Range | 8"–20" | 4"–15" | 4"–14" |

FIGS. 1, 2 and 3 illustrate the details of the handle (16) of the applicant's present invention. Specifically, handle (16) can be seen to be comprised of two support straps (18). The end of each individual support strap (18) is attached to the metal frame (14) and/or bucket body (12) at connection points (19). Each support strap (18) is threaded through a ring or slide (36), turning attention to FIG. 1, it is apparent that, when the bucket is in the expanded position, the ring or slide (36) is the apex of a triangle that is formed between support strap (18) and seam (50). Ring or slide (36) moves freely on support strap (18) to adjust the center of gravity of the bucket to various hanging configurations. There are connective panels (20) that unite support strap (18) with the bucket lip (24) along seams (50) and (51). The connective panels serve several functions. They provide support for the bucket when hung; they keep the animal from inserting a body part into the triangular configuration formed by support straps (18), ring or slide (36), and lip (24), and they restrict spillage of the contents of the bucket. The connective panels (20) may carry indicia such as the company logo or other printing on the outer surfaces thereof.

FIG. 1 illustrates the manner in which the carrying strap (22) attaches to the rings or slides (36a) and (36b). Typically, the carrying strap (22) has a first end (22a) and a second end (22b). The first end (22a) is simply wrapped around the ring or slide (36a) and sewn to itself. The second end (22b) is connected to a snap (38) such as, but not limited to, a spring-loaded or quick-release snap that will allow the user to unhook one end of the carrying strap (22) from the rest of the handle (16).

As seen in FIG. 1, the carrying strap is adjustable using a slide (40) known in the art. The slide (40) allows the carrying strap to vary the distance between rings or slides (36a) and (36b). This adjustment is very important as it, along with the fact that the entire strap can be unhooked from ring or slide (36b) by use of snap (38), allows the user to unhook the strap, adjust the length, wrap it around any surface for hanging, and rehook the strap. The user can then readjust the length of the carrying strap (22) by adjusting slide (40) for the optimum access of the bucket interior by the user. The other advantages of an adjustable strap is that the carrying strap (22) may be adjusted to the optimum length for comfortable carrying of the bucket on the shoulder of the user.

Typically, the carrying strap (22), when adjusted to maximum length, is 60 inches long and, when adjusted to the shortest possible length, is 10 inches long.

Turning now to FIGS. 1, 2 and 3, details of body (12) may be appreciated. Metal frame (14) is typically made from, but not limited to, metal of any type. Support straps (18) and carrying strap (22) are generally made from, but not limited to, standard nylon or polypropylene webbing. Hardware, such as, but not limited to, rings (36a) and (36b), snap (38), and slide (40), is typically made from, but is not limited to, either metal or nylon. Body (12), including connector panels (20), is typically made from a durable, flexible, waterproof material such as, but not limited to, heavy-duty, coated vinyl, such as but not limited to, 22-ounce weight, and provided in, but not limited to, a variety of colors, such as black, blue and red.

While the body of the bucket is described as generally rectangular, it can be seen that, in an alternate preferred embodiment, the side and end walls may cant inward. Thus, the term generally rectangular is understood to mean the shapes as illustrated as well as a shape with straight side walls and end walls.

Terms such as "left," "right," "up," "down," "bottom," "top," "front," "back," "in," "out," and like are applicable to the embodiments shown and described in conjunction with the drawings. These terms are merely for purposes of description and do not necessarily apply to the position or manner in which the invention may be constructed for use.

Although the invention has been described in connection with the preferred embodiment, it is not intended to limit the invention's particular form set forth, but on the contrary, it is intended to cover such alternatives, modifications, and equivalences that may be included in the spirit and scope of the invention as defined by the appended claims.

What is claimed is:

1. A collapsible bucket comprising:

a flexible, generally rectangular-forming, waterproof fabric body comprised of coated vinyl and having heat-sealed seams, said body having four walls depending from a perimeter and a flat bottom surface;

a rigid rectangular frame engaging the perimeter of said body to define a rectangular opening thereto;

a pair of support straps, each of said pair comprising a pair of arms, the pair of support straps engaging said body adjacent said frame, each of said support straps having skirt members extending between the arms thereof for substantially sealing against the perimeter of said body and extending above the perimeter between the ends of the support straps only to help prevent spillage of the contents of the collapsible bucket; and a carrying strap engaging said pair of support straps, said carrying strap having two ends, one end attached to one of said pair of support straps, the other attached to the second of said pair of support straps, said carrying strap being adjustable in length.

2. The collapsible bucket as set forth in claim 1, wherein one end of said carrying strap includes quick release means to quickly release one end of the carrying strap from one of the pair of support straps.

3. The collapsible bucket as set forth in claim 2, wherein said carrying strap is adjustable between 10 and 60 inches.

4. The collapsible bucket as set forth in claim 3, wherein the skirt members of each of said support straps seal against the perimeter of said body along the widthwise portions of the perimeter.

* * * * *